(12) United States Patent
Burke

(10) Patent No.: US 10,824,723 B2
(45) Date of Patent: Nov. 3, 2020

(54) IDENTIFICATION OF MALWARE

(71) Applicant: McAfee, LLC, Santa Clara, CA (US)

(72) Inventor: Daniel L. Burke, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 230 days.

(21) Appl. No.: 16/142,014

(22) Filed: Sep. 26, 2018

(65) Prior Publication Data
US 2020/0097656 A1 Mar. 26, 2020

(51) Int. Cl.
*G06F 21/56* (2013.01)

(52) U.S. Cl.
CPC .......... *G06F 21/565* (2013.01); *G06F 21/567* (2013.01); *G06F 2221/034* (2013.01)

(58) Field of Classification Search
CPC .......... G06F 21/50; G06F 21/55; G06F 21/56; G06F 21/562
See application file for complete search history.

(56) References Cited

U.S. PATENT DOCUMENTS

| | | | | |
|---|---|---|---|---|
| 9,202,021 B2* | 12/2015 | Yi | ............. | G06F 21/105 |
| 9,690,938 B1* | 6/2017 | Saxe | ............. | G06F 21/563 |
| 9,798,878 B1* | 10/2017 | Hittel | ............. | G06F 16/148 |
| 10,243,977 B1* | 3/2019 | Govindarajan | ....... | G06F 21/564 |
| 2009/0235357 A1* | 9/2009 | Ebringer | ............. | G06F 21/564 726/24 |
| 2011/0197272 A1* | 8/2011 | Mony | ............. | H04L 63/1416 726/12 |
| 2012/0079596 A1* | 3/2012 | Thomas | ............. | G06F 21/566 726/24 |
| 2012/0159625 A1* | 6/2012 | Jeong | ............. | G06F 21/562 726/23 |
| 2014/0082729 A1* | 3/2014 | Shim | ............. | G06F 21/562 726/23 |
| 2015/0186649 A1* | 7/2015 | Humble | ............. | G06F 21/564 726/23 |
| 2016/0180088 A1* | 6/2016 | Zhang | ............. | G06F 21/564 726/23 |
| 2017/0098074 A1* | 4/2017 | Okano | ............. | G06F 21/567 |
| 2017/0372071 A1* | 12/2017 | Saxe | ............. | G06F 21/562 |
| 2018/0285565 A1* | 10/2018 | Konopisk | ............. | G06F 21/56 |
| 2019/0007433 A1* | 1/2019 | McLane | ............. | G06F 21/561 |

* cited by examiner

*Primary Examiner* — Khang Do
(74) *Attorney, Agent, or Firm* — Patent Capital Group

(57) ABSTRACT

Particular embodiments described herein provide for an electronic device that can be configured to identify a binary file, identify strings in the binary file, determine that at least one string in the binary file is larger than one kilobytes of data, identify at least one substring from each of the at least one strings in the binary file is larger than one kilobytes of data, and analyze each of the at least one substrings to determine if each of the at least one substrings are suspicious and related to malware.

19 Claims, 11 Drawing Sheets

IDENTIFICATION OF MALWARE

TECHNICAL FIELD

This disclosure relates in general to the field of information security, and more particularly, to the identification of malware.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EMBODIMENTS

The following detailed description sets forth examples of apparatuses, methods, and systems relating to a system to help facilitate the identification of malware in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
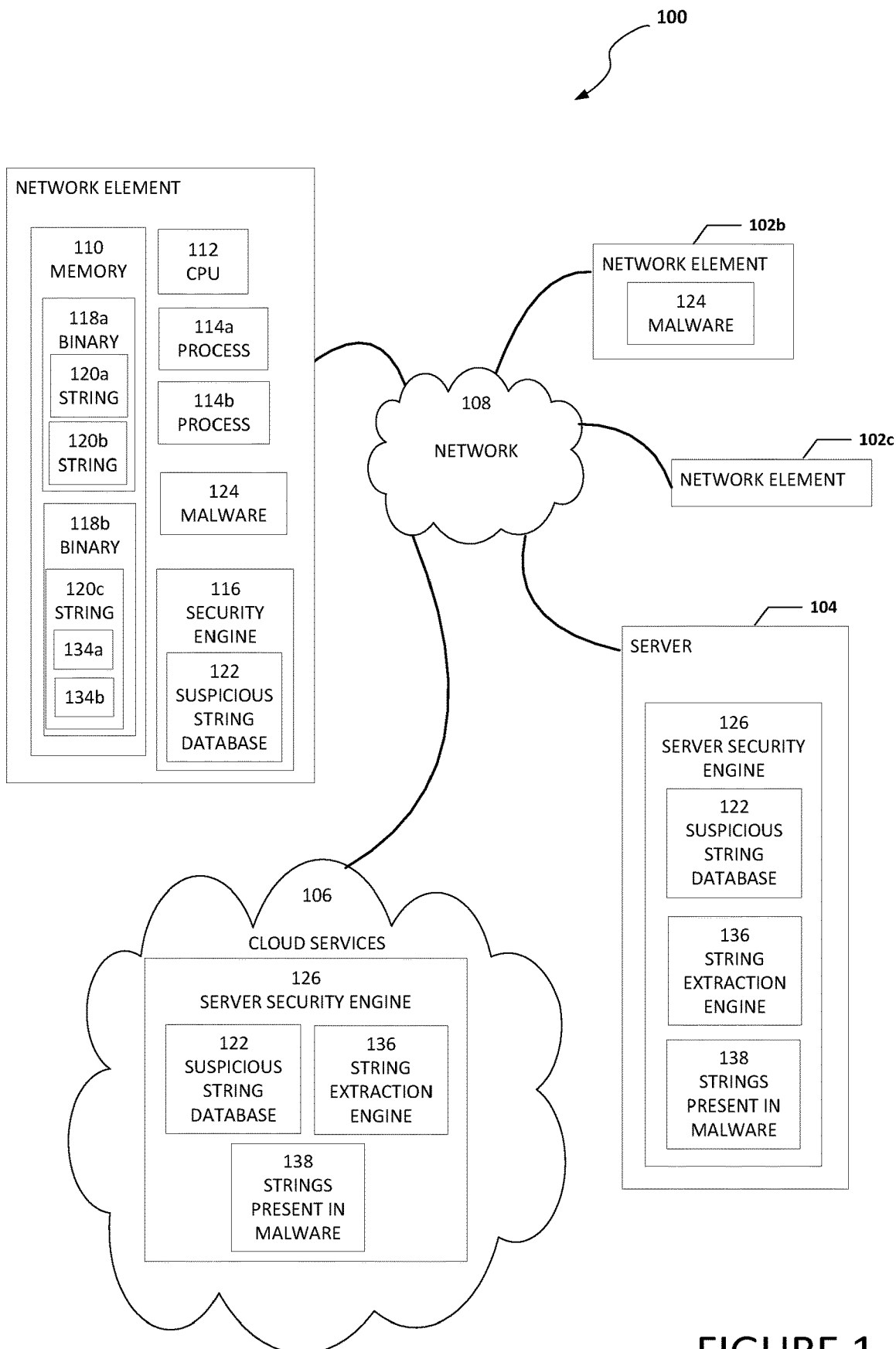
FIG. 1 is a simplified block diagram of a system to help facilitate the identification of malware in accordance with an embodiment of the present disclosure.

FIG. 1 is a simplified block diagram of a system 100 to help facilitate the identification of malware in accordance with an embodiment of the present disclosure. As illustrated in FIG. 1, an embodiment of system 100 can include network elements 102*a*-102*c*, a server 104, and cloud services 106. Network elements 102*a*-102*c*, server 104, and cloud services 106 may be in communication with each other using network 108.

Each network element 102*a*-102*c* can include memory, a computer processing unit (CPU), one or more processes, and a security engine. Memory can include one or more binary files and each binary file can include one or more strings. For example, as illustrated in FIG. 1, network element 102*a* includes memory 110, one or more CPUs 114, one or more processes 114*a* and 114*b*, and a security engine 116. Memory 110 can include one or more binary files 118*a* and 118*b* and each binary file can include one or more strings 120. For example, binary file 118*a* can include strings 120*a* and 120*b*.

Each binary file 118a and 118b may be a computer file that is stored in binary format. A binary format is a format in which file information is stored in the form of ones and zeros, or in some other binary (two-state) sequence. This type of format is often used for executable files and numeric information in computer programming and memory. Each string 120 can be a literal constant or some kind of variable.

Some strings may be large and the large strings can include one or more substrings. For example, binary file 118b may include string 120c and string 120c may be a large string. String 102c can include one or more substrings 134a and 134b. The term "substrings" includes strings within a large string. The term "large string" includes strings that are larger than a predetermined length. The term "small strings" includes strings that are less than the predetermined length. The predetermined length is a length determined by an administrator and depends on the capacity of the system. For example, in an implementation, the predetermined length may be over one kilobyte of data. In this implementation, a large string would be any string that is one kilobyte of data or larger and a small string would be any string that is less than one kilobyte of data. In other implementations, the predetermined length may be larger or smaller than one kilobyte, depending on system resources and the capacity of the system. For example, a large string may be any string over two kilobytes of data. In some current systems, strings over one kilobyte of data are considered large strings and are not typically analyzed for malware.

Security engine 116 can include a suspicious string database 122. Each of processes 114a and 114b may be a computer program, function, virtual network function (VNF), etc. In an example, network element 102a can include malware 124. Malware 124 may cause a malicious binary file to be located in memory 110. Server 104 can include a server security engine 126. Server security engine 126 can include suspicious string database 122, a string identification engine 136, and a database of strings present in binary malware 138. Cloud services 106 can include suspicious string database 122, string identification engine 136, and database of strings present in binary malware 138.

String identification engine 1366 can be configured to extract malicious strings from known malware and the malicious strings can be stored in database of strings present in binary malware 138. Server security engine 126 can rank the malicious strings in database of strings present in binary malware 138 and cause the highest ranked malicious strings (e.g., top one hundred malicious strings or some other number of malicious strings based on the capacity of suspicious string database 122) to be stored in database of strings present in binary malware 138. In an example, the ranking can be based on the frequency each malicious string was found in malware or some other means may be used to rank the malicious strings. Suspicious string database 122 can be communicated to the network elements to help security engine 116 try and identify malware.

In a network element, security engine 116 can be configured to identify and analyze each string in each binary file to try and identify malware. The strings customize textual data within the binary files and are identified by markers as detailed in the Windows Portable Executable file format specification. These strings can represent, for example, title labels on a dialog window or malicious commands encoded for later injection. In an example, security engine 116 can use the suspicious strings in suspicious string database 122 to analyze each string in each binary file to try and identify malware. If an entry in suspicious string database 122 matches a string, then the binary file that included the string can be categorized as suspicious and possibly related to malware. In another example, security engine 116 can analyze each string and compare each string to entries in suspicious string database 122 to determine if there is a match in suspicious string database 122. If a string does match an entry in suspicious string database 122, then the binary file that included the string can be categorized as suspicious and possibly related to malware.

In addition, for large strings, security engine 116 can use the suspicious strings in suspicious string database 122 to analyze each substring in a large string of a binary file to try and identify malware. If a large string contains a substring in the suspicious string database 122, then the binary file that included the substring can be categorized as suspicious and possibly related to malware. In another example for large strings, security engine 116 can search each substring in a large string for the presence of each suspicious string in of the suspicious string database 122. The substrings are portions of a large string. In an example, the condition of each suspicious string from the suspicious string database 122 that is inside the large string can be combined with static features of the binary file and help to determine if a binary file is malware or is related to malware. The term "static features" includes attributes of the binary file that can be determined without running or executing the binary file (e.g., source code language, complier used, linked DLLS, etc.).

In an illustrated example, a suspicious string may be "malware_variant 1" or "haxor." A binary file may include the large string (a string over one kilobyte of data, over two kilobytes of data, etc.) " . . . and your system has been haxored and your machine is under the control of qjmalware_variant 1. You are now . . . " Security engine 116 can be configured to identify the substrings "malware_variant 1" and "haxor" in the large string and determine that the binary file that includes the large string is suspicious and possibly related to malware.

Searching large strings for the presence of suspicious substrings can help to detect malware that could otherwise go undetected. In addition, suspicious strings database 122 can help to improve detection rate and confidence on suspicious files by allowing for a means to analyze the large strings. Suspicious strings database 122 can also be used as a scaling optimization by allowing more determinations to occur on a network element, causing less workload for the server, and allowing better operational behavior for the network element in offline mode.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

Malicious software ("malware") that infects a host computer may be able to perform any number of malicious actions, such as stealing sensitive information from a business or individual associated with the host computer, propagating to other host computers, assisting with distributed denial of service attacks, sending out spam or malicious emails from the host computer, etc. Hence, significant administrative challenges remain for protecting computers and computer networks from malicious and inadvertent exploitation by malicious software and devices. One way malicious operators can infect a host computer is to use a binary file.

Generally, a binary file is a computer file that is stored in binary format. A binary format is a format in which file information is stored in the form of ones and zeros, or in some other binary (two-state) sequence. This type of format is often used for executable files and numeric information in computer programming and memory. All executable programs are stored in binary files, as are most numeric data files. The term "binary file" is often used as a term meaning non-text file and binary files are often referred to as executable files.

String data in binary files can be a useful attribute in analysis to classify a file as malware or clean. While uncommon, some strings in binary files can be very large, for example, over one kilobyte of data or over two kilobytes of data. Typically, the large strings are discarded, rather than being analyzed and/or sent to a server for analysis, as sending the large strings would have a negative impact on scalability and performance in the network traffic and data processing. In addition, large strings can affect machine learning performance. What is needed is a system and method to use these large strings in an assessment of potential malware.

A system and method to identify malware, as outlined in FIG. 1 can resolve these issues (and others). Using security engine 116, system 100 can be configured to analyze a binary file to determine if the file is malware or is suspected to be malware. Security engine 116 can identify static features of the binary files and strings in the binary files (e.g., using libBFD or some other means of extracting static features from binary files). In an example, security engine 116 can be configured to search a string using the entries from suspicious string database 122 to analyze each string or substring in each binary file and try and identify malware. In another example, security engine 116 can identify the strings of length less than a predefined length threshold and analyze each string and compare each string to entries in suspicious string database 122 to determine if there is a match in suspicious string database 122. Also, each string may be sent to server 104 and/or cloud services 106 for analysis by server security engine 126. Suspicious string database 122 can be used by a network element to check the smaller strings for matches and to provide analytical data that can be used in a classification analysis by security engine 116, which would be available in online and offline mode, and/or by server security engine 126 (checking against the master suspicious strings database).

For large strings, or strings longer than a predefined length, the large string is analyzed and substrings in the large string are determined. Security engine 116 can be configured to use the entries from suspicious string database 122 and search the substrings for a match to try and identify malware. Each of the identified substrings can be compared to entries in suspicious string database 122 and the results of the comparison can be used in a classification analysis by security engine 116, which would be available in online and offline mode, and/or by server security engine 126 (checking against the master suspicious strings database). Each substring that is determined to be associated with malware can be added to suspicious string database 122.

Suspicious string database 122 on security engine 116 can be replicated from server security engine 126 for initial deployment or updates, or deployed initially as part of security engine 116 and updated. Server security engine 126 can be configured to classify files analyzed by security engine 116. Also, server security engine 126 can be configured to determine which substrings to include in suspicious string database 122 by examining which strings appear frequently in malware and not in clean files. This can be done using a Bayesian probability analysis, logistic regression, clustering, binary classifiers, or other means. Other factors may be considered in making the determination of whether or not a string should be included in suspicious string database 122 (e.g., manual adjustments by an administrator of the system, systems to check for the existence of suspicious or innocuous patterns, etc.).

Turning to the infrastructure of FIG. 1, system 100 in accordance with an example embodiment is shown. Generally, system 100 can be implemented in any type or topology of networks. Network 108 represents a series of points or nodes of interconnected communication paths for receiving and transmitting packets of information that propagate through system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Network elements 102a-102c can each be a desktop computer, laptop computer, mobile device, personal digital assistant, smartphone, tablet, network appliances, servers, routers, switches, gateways, bridges, load balancers, or any other suitable device, component, element, or object operable to exchange information in a network environment. Server 104 can be a network element such as a server or virtual server and can be associated with clients, customers, endpoints, or end users wishing to initiate a communication in system 100 via some network (e.g., network 108). The term 'server' is inclusive of devices used to serve the requests of clients and/or perform some computational task on behalf of clients within system 100. Cloud services 106 is configured to provide cloud services to network elements 102a-102c. Cloud services may generally be defined as the use of computing resources that are delivered as a service over a network, such as the Internet. Typically, compute, storage, and network resources are offered in a cloud infrastructure, effectively shifting the workload from a local network to the cloud network. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with system 100, each of network elements 102a-102c, server 104, and cloud services 106 can include memory elements (e.g., memory 110) for storing information to be used in the operations outlined herein. Each of network elements 102a-102c, server 104, and cloud services 106 may keep information in any suitable memory element (e.g., disk, random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of system 100, such as network elements 102a-102c, server 104, and cloud services 106 may include software modules (e.g., security engine 116, server security engine 126, string identification engine 136, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c, server 104, and cloud services 106 may include a processor (e.g., CPU 112) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
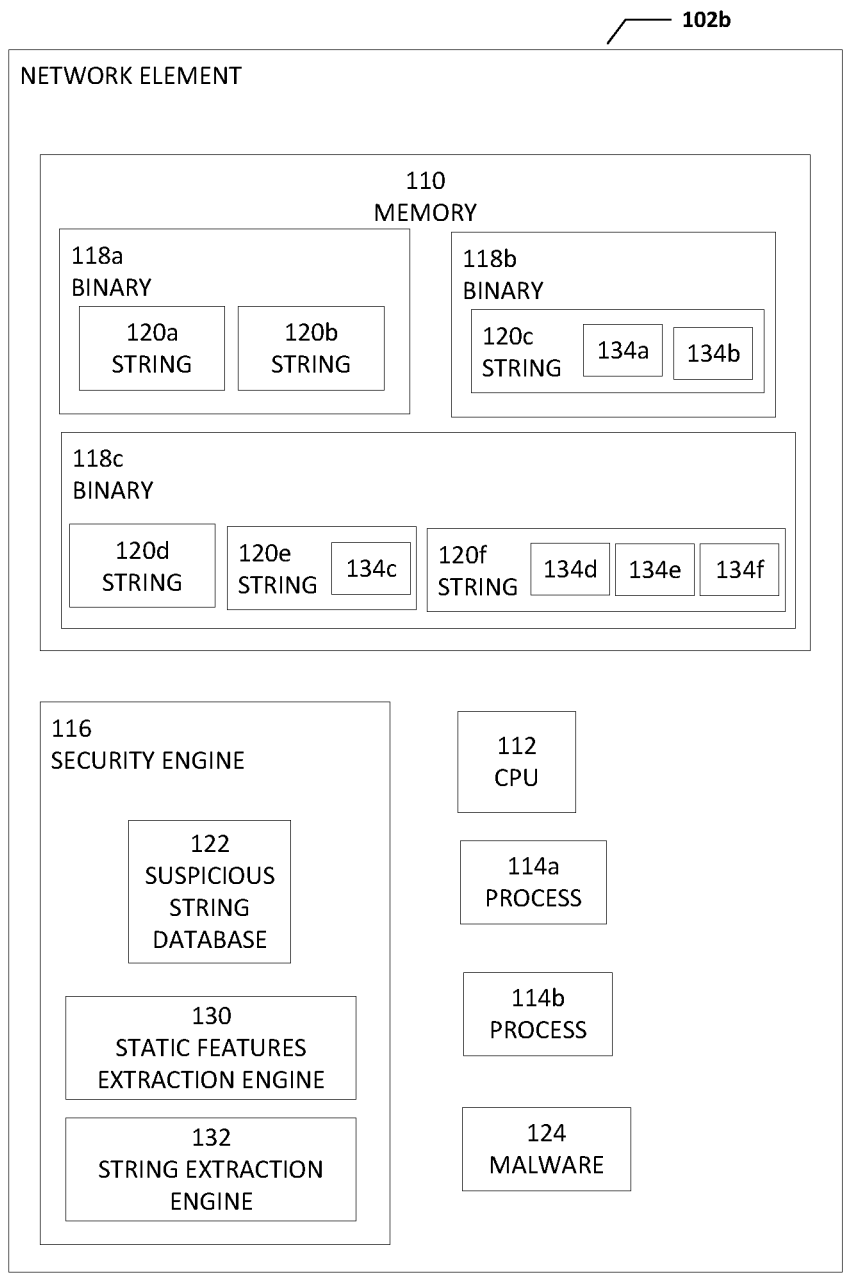
FIG. 2 is a simplified block diagram of a portion of a system to help facilitate the identification of malware in accordance with an embodiment of the present disclosure.

Turning to FIG. 2, FIG. 2 is a simplified block diagram of a portion of a system 100 to help facilitate the identification of malware in accordance with an embodiment of the present disclosure. In an example, network element 102b can include memory 110, CPU 112, processes 114a and 114b, and security engine 116. Memory 110 can include one or more binary files and each binary file can include one or more strings. Some strings in a binary file may be large strings and include one or more substrings. For example, binary file 118b can include string 120c and string 120c may be a large string. String 102c can include substrings 134a and 124b. Binary file 118c can includes strings 120d, 120e, and 120f. Strings 120e and 120f may be large strings and include one or more substrings. For example, string 120e may include substring 134c. String 120f may include substrings 124d, 124e, and 134f. Security engine 116 can include suspicious string database 122, a static features extraction engine 130, and a string identification engine 136.

Static features extraction engine 130 can be configured to analyze binary files and extract static features from each of the binary files. For example, static features extraction engine 130 can be configured to analyze binary file 118a and extract attributes of the binary file that can be determined without running or executing the binary files. The static features of a binary file extracted by static features extraction engine 130 can be used by security engine 116 to help determine if a binary file is a suspicious binary file and related to malware.

String identification engine 136 can be configured to analyze binary files and identify one or more strings from each binary file. For example, string identification engine 136 can be configured to analyze binary file 118a and identify strings 120a and 120b. Security engine 116 can compare each string 120a and 120b to entries in suspicious string database 122 to determine if there is a match. If there is a match, (e.g., string 120a matches an entry in suspicious string database 122), then binary 118a can be classified as suspicious. In addition, string identification engine 136 can be configured to analyze binary files and identify substrings from large strings. For example, string identification engine 136 can be configured to analyze binary file 118b and identify string 120c. String 120c may be a large string and string identification engine 136 can identify substrings from string 120*c*. For example, string identification engine 136 can identify substrings 134*a* and 134*b* from string 120*c* of binary file 118*b*. Each substring 134*a* and 134*b* can be compared to entries in suspicious string database 122 to determine if there is a match. If there is a match, (e.g., substring 134*a* matches an entry in suspicious string database 122), then binary 118*b* can be classified as suspicious. In other examples, security engine 116 can be configured to search a string or substring using the entries from suspicious string database 122 to analyze each string or substring in each binary file and try to determine if an entry from suspicious string database 122 can be found in the string or substring.

Figure 3:
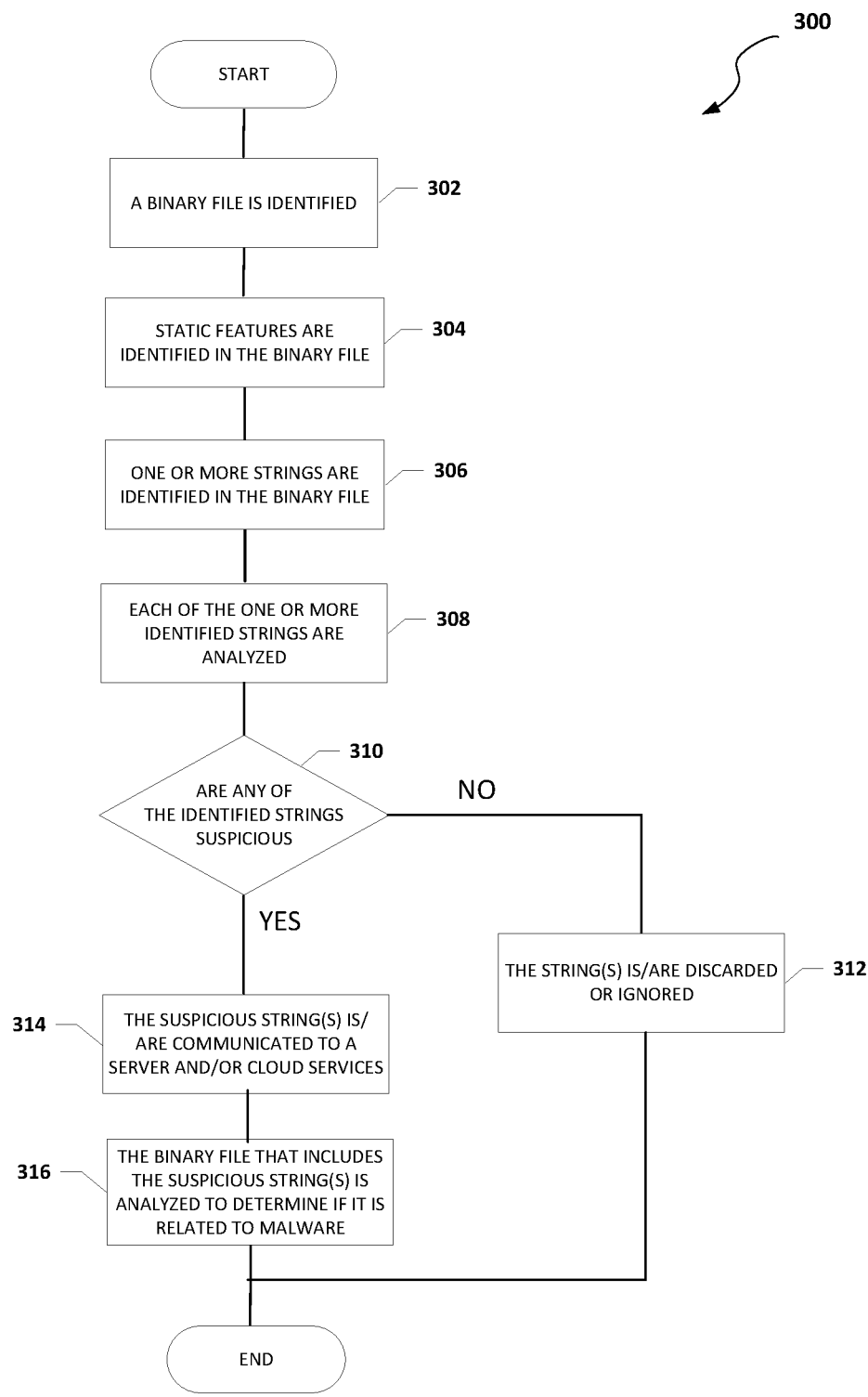
FIG. 3 is a simplified flowchart illustrating potential operations that may be associated with the system in accordance with an embodiment.

Turning to FIG. 3, FIG. 3 is an example flowchart illustrating possible operations of a flow 300 that may be associated with the identification of malware, in accordance with an embodiment. In an embodiment, one or more operations of flow 300 may be performed by security engine 116, static features extraction engine 130, string identification engine 136, and server security engine 126. At 302, a binary file is identified. At 304, static features are identified from the binary file. For example, the static features include attributes of the binary file that can be determined without running or executing the binary file. At 306, one or more strings are identified in the binary file. At 308, each of the one or more identified strings are analyzed. For example, each of the one or more identified strings can be analyzed using suspicious string database 122 to determine if the string is a suspicious string. At 310, the system determines if any of the identified strings are suspicious. If any of the extracted strings are not suspicious, then the string(s) is/are discarded or ignored, as in 312.

If any of the identified strings are suspicious, then the suspicious string(s) is/are communicated to a server (e.g., server 104) and/or cloud services (e.g., cloud services 106), as in 314. At 316, the binary file that includes the suspicious string(s) is analyzed to determine if it is related to malware. For example, using the static features identified from the binary file in 304 and the suspicious classification of a string, the binary file that includes the suspicious string can be analyzed to determine if it is related to malware (the suspicious classification of the string is a contributing factor in determining if the binary file is related to malware). In an example, the analysis of the binary file that includes the suspicious string can be done locally (e.g., on network element 102*a*) or at the server and/or the cloud services where the suspicious string was communicated in 314. If the binary file is determined to be related to malware, then remedial action can be taken (e.g., quarantining the binary file, alerting a user, etc.).

Figure 4:
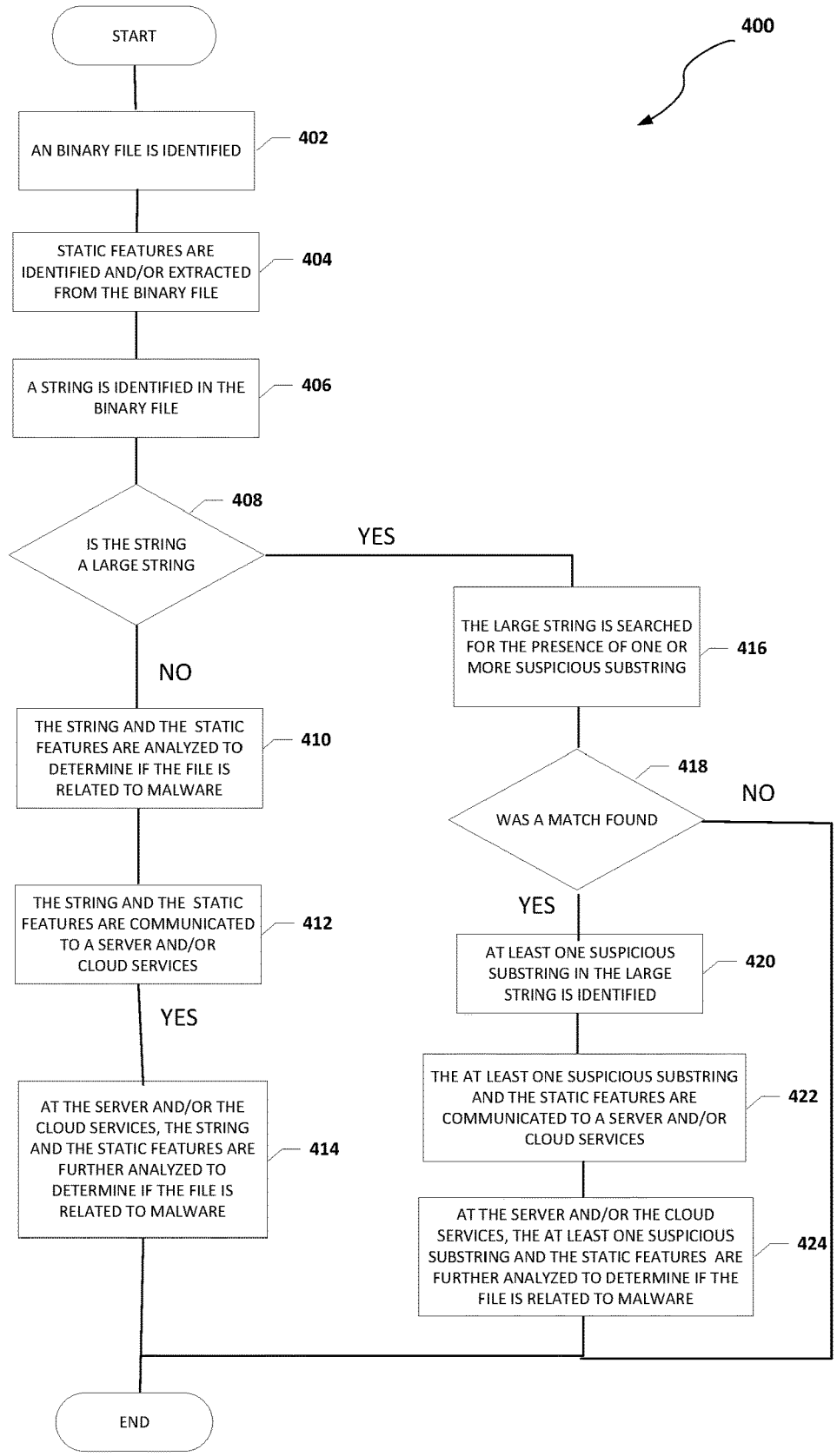
FIG. 4 is a simplified flowchart illustrating potential operations that may be associated with the system in accordance with an embodiment.

Turning to FIG. 4, FIG. 4 is an example flowchart illustrating possible operations of a flow 400 that may be associated with the identification of malware, in accordance with an embodiment. In an embodiment, one or more operations of flow 400 may be performed by security engine 116, static features extraction engine 130, string identification engine 136, and server security engine 126. At 402, a binary file is identified. At 404, static features are identified and/or extracted from the binary file. For example, the static features include attributes of the binary file that can be determined without running or executing the binary file. At 406, a string is identified in the binary file. At 408, the system determines if the string is a large string. For example, a "large string" is a string that is larger than a predetermined length. If the string is not a large string (is smaller than the predetermined length), then the string and the static features are analyzed to help determine if the file is related to malware or is suspicious, as in 410. For example, the string can be analyzed using suspicious string database 122 to determine if the string is a suspicious string. At 412, the string and the static features are communicated to a server (e.g., server 104) and/or cloud services (e.g., cloud services 106). At 414, at the server and/or cloud services, the string and the static features are further analyzed to determine if the file is related to malware. If the file is determined to be related to malware, then remedial action can be taken (e.g., quarantining the binary file, alerting a user, etc.).

Going back to 408, if the string is a large string, then the large string is searched for the presence of one or more suspicious substrings, as in 416. For example, the large string can be searched using each entry in a suspicious string database. More specifically, each entry in suspicious string database 122 can be used to search the large string to determine if an entry in suspicious string database 122 is found in the large string. At 418, the system determines if a match was found. If a match was not found, then the process ends. If a match was found, then at least one suspicious substring in the large string is identified, as in 420. For example, at least one substring in the large string matches an entry in suspicious string database 122 and therefore causes the matching substring to be a suspicious substring. At 422, the at least one suspicious substring and the static features are communicated to a server and/or cloud services. At 424, at the server and/or the cloud services, the at least one suspicious substring and the static features are further analyzed to determine if the file is related to malware. For example, using the static features identified and/or extracted from the binary file in 404 and the suspicious classification of the substring, the file can be analyzed to determine if it is related to malware (the suspicious classification of the substring is a contributing factor in determining if the file is related to malware). If the file is determined to be related to malware, then remedial action can be taken (e.g., quarantining the binary file, alerting a user, etc.).

Figure 5:
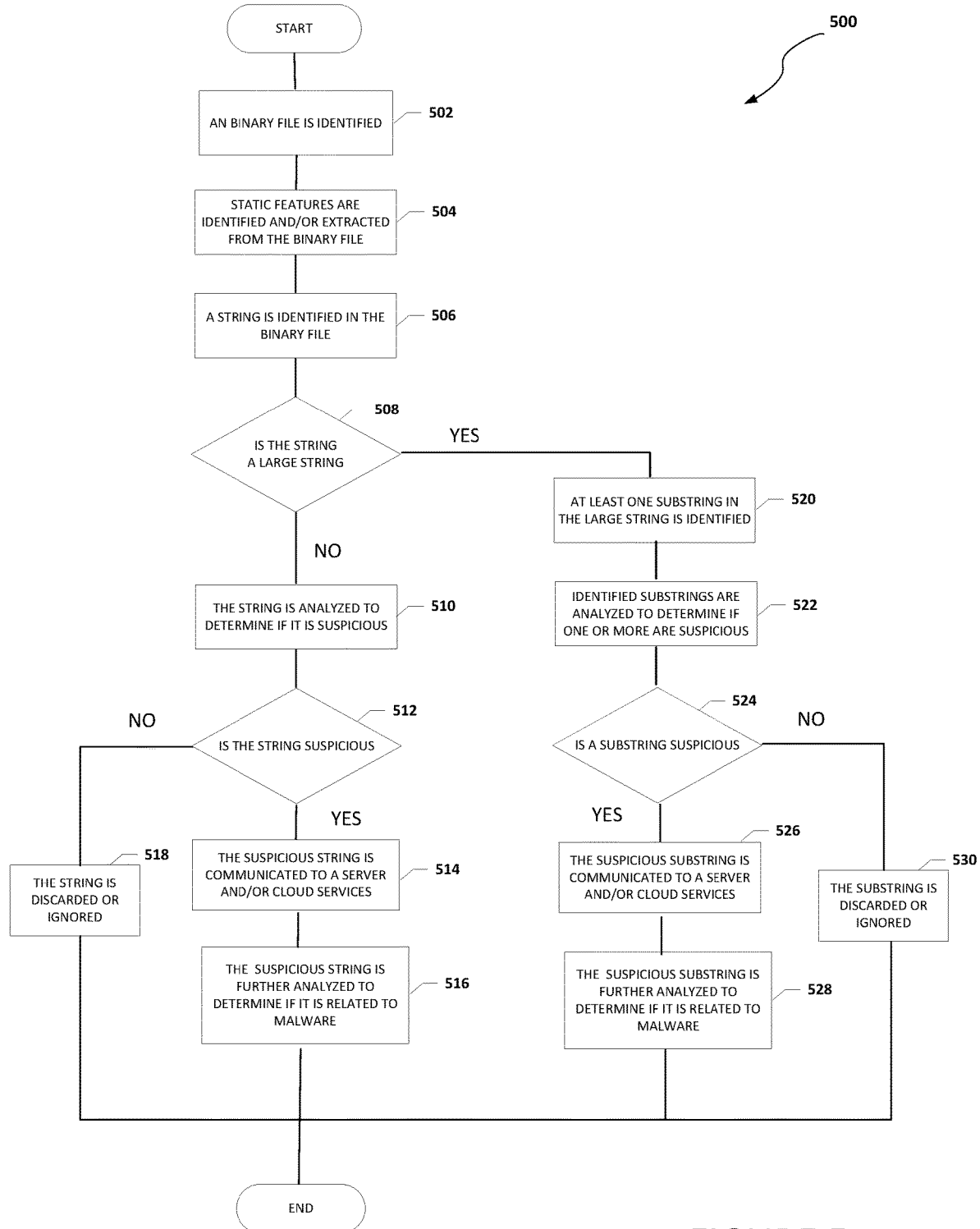
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with the identification of malware, in accordance with an embodiment. In an embodiment, one or more operations of flow 500 may be performed by security engine 116, static features extraction engine 130, server security engine 126, and string identification engine 136. At 502, a binary file is identified. At 504, static features are identified and/or extracted from the binary file. At 506, a string is identified in the binary file. At 508, the system determines if the string is a large string. For example, a "large string" is a string that is larger than a predetermined length. If the string is not a large string (is smaller than the predetermined length), then the string is analyzed to determine if it is suspicious, as in 510. For example, each of the one or more extracted strings can be analyzed using suspicious string database 122 to determine if the string is a suspicious string. More specifically, entries in suspicious string database 122 can be used to search the string for a match. At 512, the system determines if the string is suspicious. If the string is suspicious, then the suspicious string is communicated to a server and/or cloud services, as in 514. In an example, the suspicious string and static features related to the binary file that included the suspicious string are communicated to the server and/or cloud services. At 516, the suspicious string is analyzed to determine if it is related to malware. For example, using the static features identified and/or extracted from the binary file in 504 and the suspicious classification of the string, the suspicious string can be analyzed to determine if it is related to malware (the suspicious classification of the string is a contributing factor in determining if the suspicious string is related to malware). In an example, the analysis of the suspicious string can be done locally (e.g., on network element 102a) or at the server and/or the cloud services where the suspicious string was communicated in 514. If the suspicious string is determined to be related to malware, then remedial action can be taken (e.g., quarantining the binary file, alerting a user, etc.). If the string is not suspicious, then the string is discarded or ignored, as in 518. In other examples, if the string is not related to malware, then the string can be sent for further analysis, evaluation, and/or for use by a different process, application, device, network element, etc.

Going back to 508, if the string is a large string, then at least one substring in the large string is identified, as in 520. In an example, at least one substring in the large string can be identified and extracted. At 522, identified substrings are analyzed to determine if one or more are suspicious. For example, each identified substring can be analyzed using suspicious string database 122 to determine if the substring is a suspicious substring. At 524, the system determines if a substring is suspicious. For example, each substring can be compared to entries in substring database to determine if the substring matches an entry in substring database. If the substring is suspicious, then the suspicious substring is communicated to a server and/or cloud services, as in 526. In an example, the suspicious string and static features related to the binary file that included the suspicious string are communicated to the server and/or cloud services. At 528, the suspicious substring is analyzed to determine if it is related to malware. For example, using the static features identified and/or extracted from the binary file in 504 and the suspicious classification of the string, the suspicious substring can be analyzed to determine if it is related to malware (the suspicious classification of the string is a contributing factor in determining if the suspicious substring is related to malware). In an example, the analysis of the suspicious string can be done locally (e.g., on network element 102a) or at the server and/or the cloud services where the suspicious string was communicated in 526. If the suspicious substring is determined to be related to malware, then remedial action can be taken (e.g., quarantining the binary file, alerting a user, etc.). If the string is not suspicious, then the string is discarded or ignored, as in 530. In other examples, if the substring is not related to malware, then the substring can be sent for further analysis, evaluation, and/or for use by a different process, application, device, network element, etc.

Figure 6:
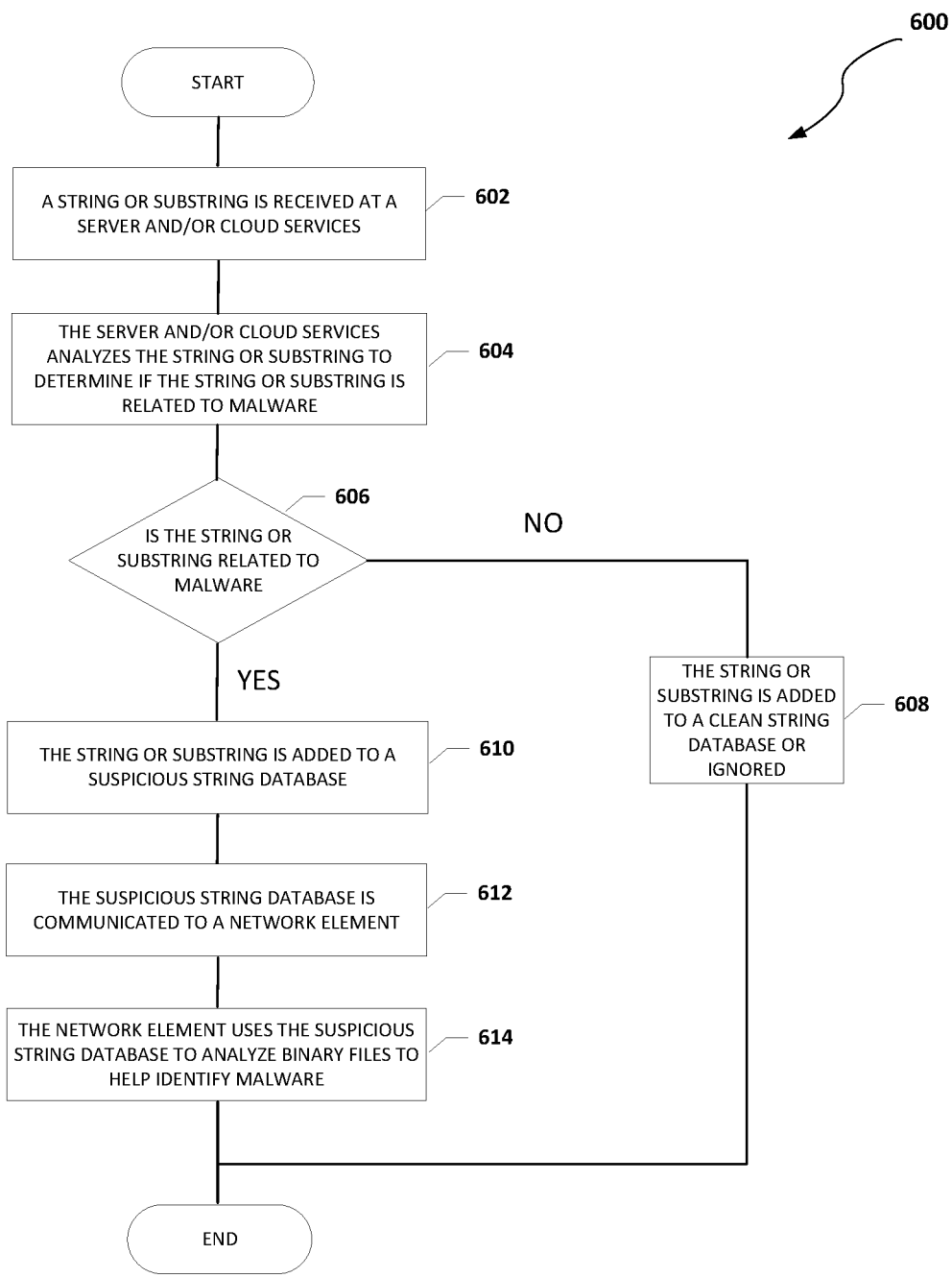
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with the identification of malware, in accordance with an embodiment. In an embodiment, one or more operations of flow 600 may be performed by security engine 116, static features extraction engine 130, server security engine 126, and string identification engine 136. At 602, a string or substring is received at a server and/or cloud services. At 604, the server and/or cloud services analyzes the string or substring to determine if the string or substring is related to malware. At 606, the system determines if the string or substring is related to malware. For example, a Bayesian classifier can be used to determine if the string or substring is prevalent in known malware files and not in known clean files. If the string or substring is not related to malware, then the string or substring is added to a clean string database or ignored, as in 608. In other examples, if the string is not related to malware, then the string can be sent for further analysis, evaluation, and/or for use by a different process, application, device, network element, etc. If the string or substring is related to malware, then the string or substring is added to a suspicious string database, as in 610. At 612, the suspicious string database is communicated to a network element. At 614, the network element uses the suspicious string database to analyze binary files to help identify malware.

Figure 7:
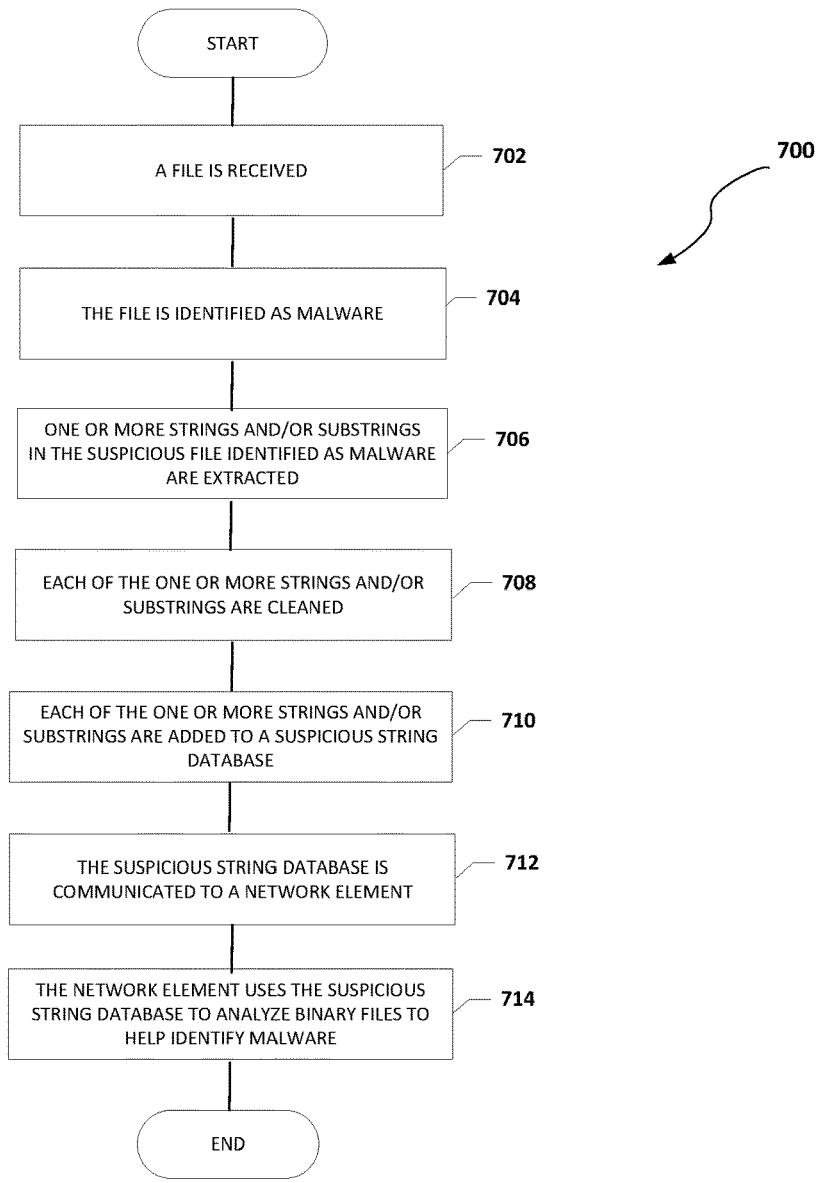
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with the identification of malware, in accordance with an embodiment. In an embodiment, one or more operations of flow 700 may be performed by security engine 116, static features extraction engine 130, string identification engine 136, and server security engine 126. At 702, a file is received. In an example, the file is a suspicious file that may be related to malware. At 704, the file is identified as malware. For example, logistic regression and clustering or some other means may be used to identify the file as malware. At 706, one or more strings and/or substrings in the file identified as malware are extracted. In an example, strings less than two kilobytes are extracted. At 708, each of the one or more strings and/or substrings are cleaned if possible. For example, the strings and/or substrings may have white spaces removed, etc. Some strings and/or substrings may not be able to be cleaned. At 710, each of the one or more strings and/or substrings are added to a suspicious string database. At 712, the suspicious string database is communicated to a network element. At 714, the network element uses the suspicious string database to analyze binary files to help identify malware.

Figure 8:
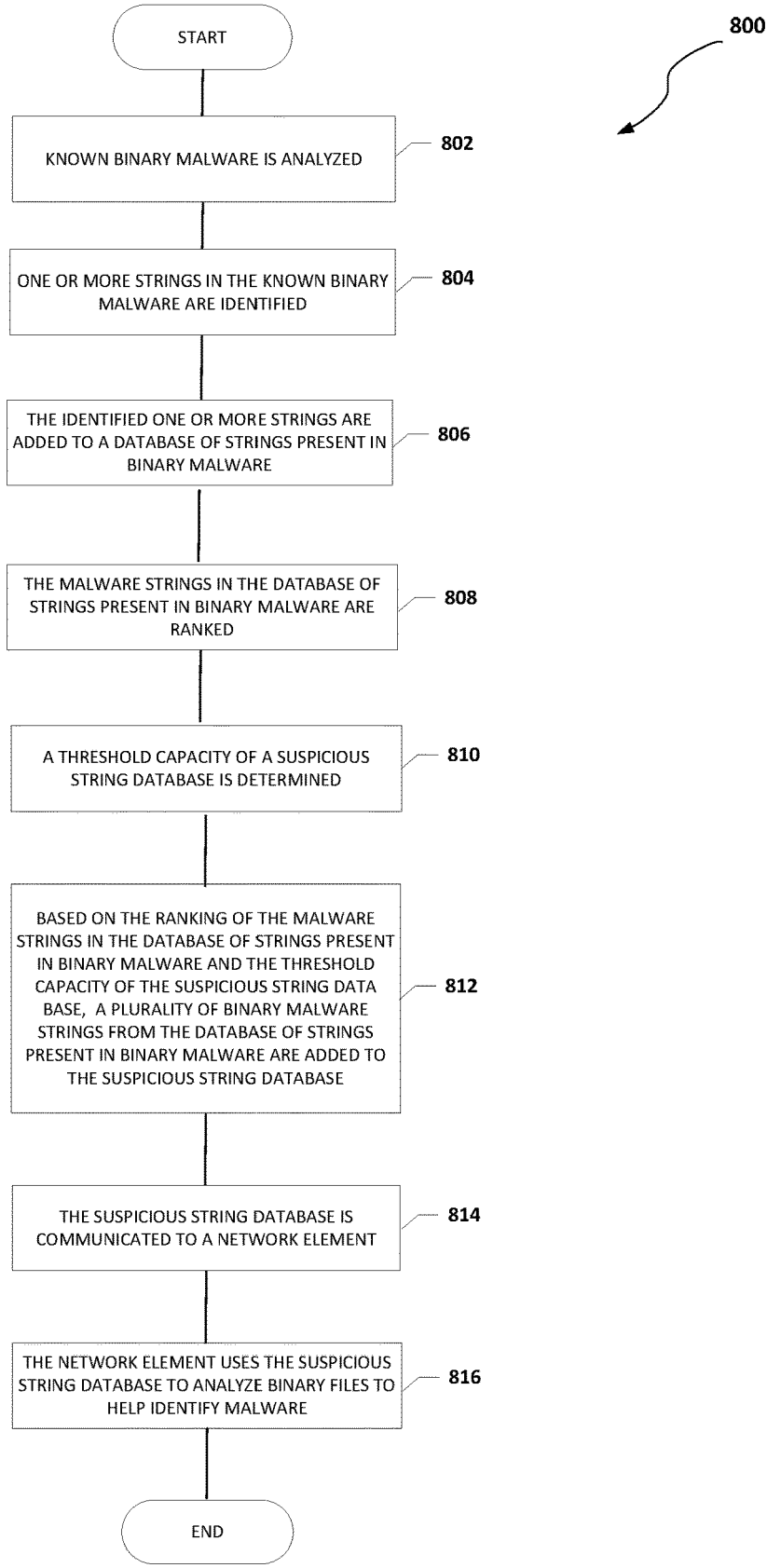
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with the identification of malware, in accordance with an embodiment. In an embodiment, one or more operations of flow 800 may be performed by security engine 116, static features extraction engine 130, server security engine 126, and string identification engine 136. At 802, known binary malware is analyzed. At 804, one or more strings in the known binary malware are identified. At 806, the identified one or more strings are added to a database of strings present in binary malware. At 808, the malware strings in the database of strings present in binary malware are ranked. In an example, the ranking can be based on the frequency each malicious string was found in malware samples or some other means may be used to rank the malicious strings. Also, the strings may be compared to a clean string database to see if they match an entry in the clean string database (e.g., a database of known clean strings) and if a string does match an entry in the clean string database, then the string is given a low rank or removed from the database of strings present in binary malware. At 810, a threshold capacity of a suspicious string database is determined. For example, the threshold capacity or memory size of suspicious string database 122 may be determined. At 812, based on the ranking of the malware strings in the database of strings present in binary malware and the threshold capacity of the suspicious string database, a plurality of binary malware strings from the database of strings present in binary malware are added to the suspicious string database. At 814, the suspicious string database is communicated to a network element. At 816, the network element uses the suspicious string database to analyze binary files to help identify malware.

Figure 9:
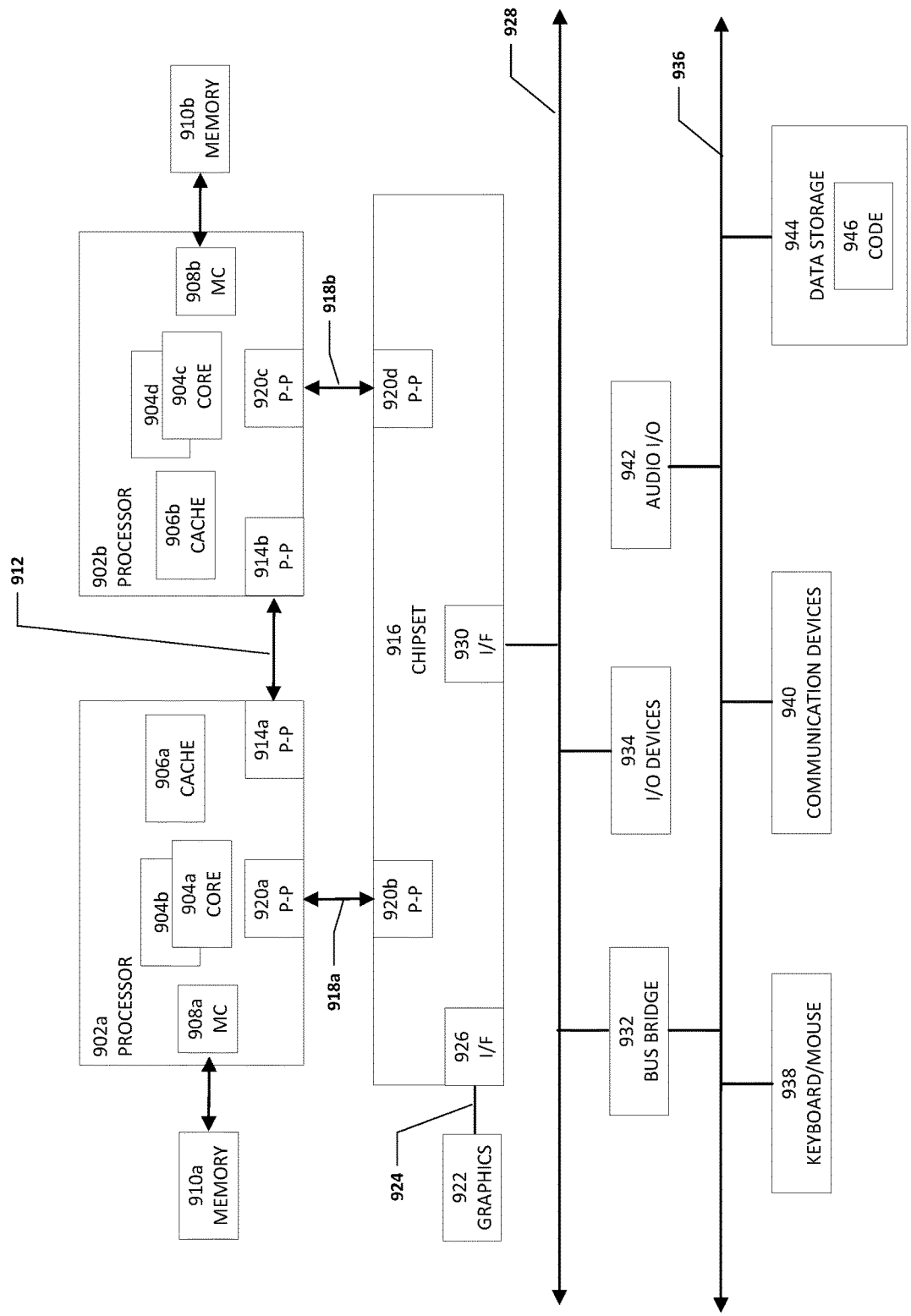
FIG. 9 is a block diagram illustrating an example computing system that is arranged in a point-to-point configuration in accordance with an embodiment.

Turning to FIG. 9, FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the network elements of system 100 may be configured in the same or similar manner as computing system 900.

As illustrated in FIG. 9, system 900 may include several processors, of which only two, processors 902a and 902b, are shown for clarity. While two processors 902a and 902b are shown, it is to be understood that an embodiment of system 900 may also include only one such processor. Processors 902a and 902b may each include a set of cores (i.e., processors cores 904a and 904b and processors cores 904c and 904d) to execute multiple threads of a program. The cores may be configured to execute instruction code in a manner similar to that discussed above with reference to FIGS. 1-8. Each processor 902a and 902b may include at least one shared cache 906a and 906b respectively. Shared caches 906a and 906b may each store data (e.g., instructions) that are utilized by one or more components of processors 902a and 902b, such as processor cores 904a and 904b of processor 902a and processor cores 904c and 904d of processor 902b.

Processors 902a and 902b may also each include integrated memory controller logic (MC) 908a and 908b respectively to communicate with memory elements 910a and 910b. Memory elements 910a and/or 910b may store various data used by processors 902a and 902b. In alternative embodiments, memory controller logic 908a and 908b may be discrete logic separate from processors 902a and 902b.

Processors 902a and 902b may be any type of processor and may exchange data via a point-to-point (PtP) interface 912 using point-to-point interface circuits 914a and 914b respectively. Processors 902a and 902b may each exchange data with a chipset 916 via individual point-to-point interfaces 918a and 918b using point-to-point interface circuits 920a-920d. Chipset 916 may also exchange data with a high-performance graphics circuit 922 via a high-performance graphics interface 924, using an interface circuit 926, which could be a PtP interface circuit. In alternative embodiments, any or all of the PtP links illustrated in FIG. 9 could be implemented as a multi-drop bus rather than a PtP link.

Chipset 916 may be in communication with a bus 928 via an interface circuit 930. Bus 928 may have one or more devices that communicate over it, such as a bus bridge 932 and I/O devices 934. Via a bus 936, bus bridge 932 may be in communication with other devices such as a keyboard/mouse 938 (or other input devices such as a touch screen, trackball, etc.), communication devices 940 (such as modems, network interface devices, or other types of communication devices that may communicate through a network), audio I/O devices 942, and/or a data storage device 944. Data storage device 944 may store code 946, which may be executed by processors 902a and/or 902b. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 10:
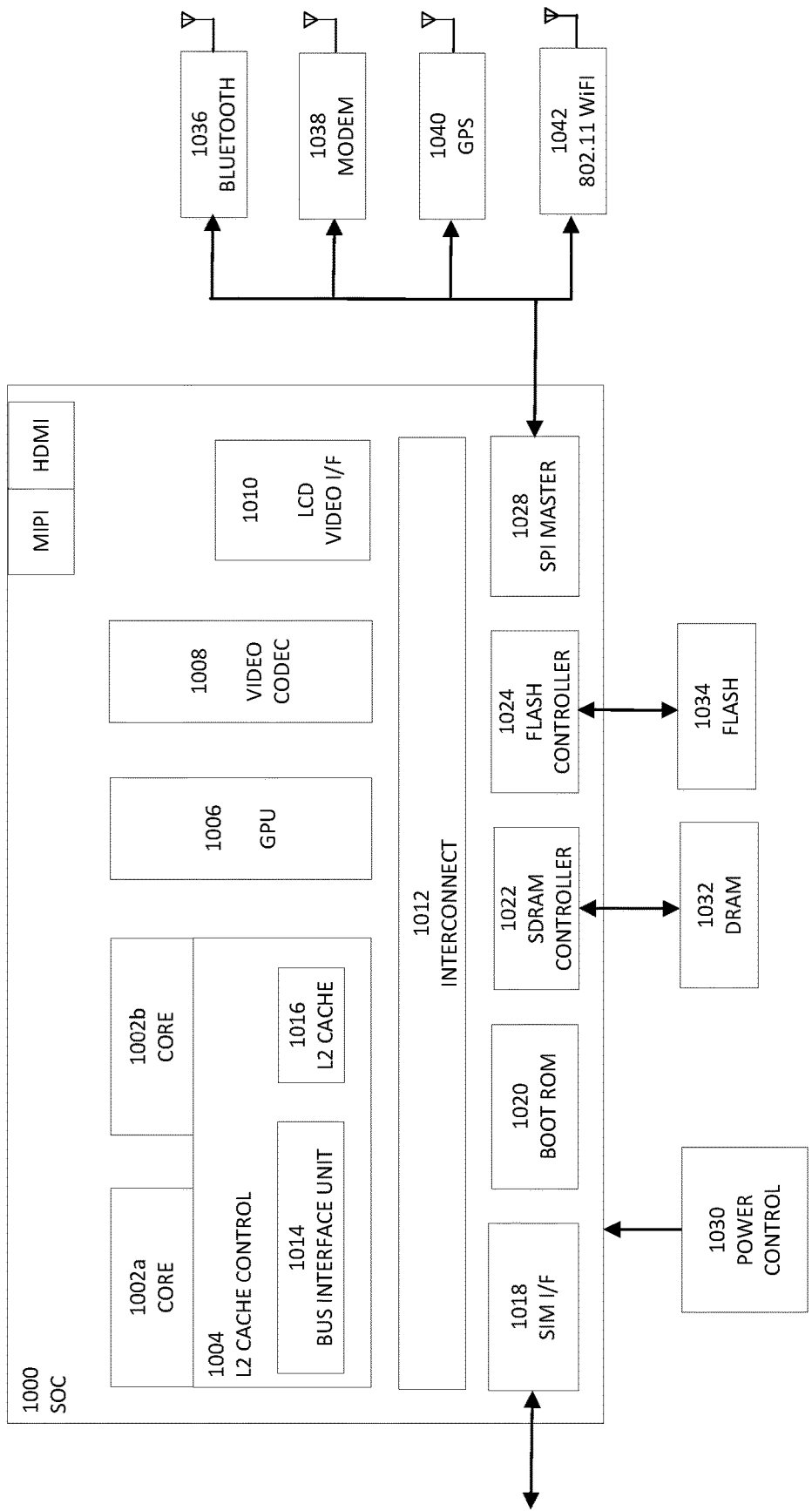
FIG. 10 is a simplified block diagram associated with an example ARM ecosystem system on chip (SOC) of the present disclosure.

Turning to FIG. 10, FIG. 10 is a simplified block diagram associated with an example ecosystem SOC 1000 of the present disclosure. At least one example implementation of the present disclosure can include the device pairing in a local network features discussed herein and an ARM component. For example, the example of FIG. 10 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 10, ecosystem SOC 1000 may include multiple cores 1002a and 1002b, an L2 cache control 1004, a graphics processing unit (GPU) 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/high-definition multimedia interface (HDMI) links that couple to an LCD.

Ecosystem SOC 1000 may also include a subscriber identity module (SIM) I/F 1018, a boot read-only memory (ROM) 1020, a synchronous dynamic random-access memory (SDRAM) controller 1022, a flash controller 1024, a serial peripheral interface (SPI) master 1028, a suitable power control 1030, a dynamic RAM (DRAM) 1032, and flash 1034. In addition, one or more embodiments include one or more communication capabilities, interfaces, and features such as instances of Bluetooth™ 1036, a 3G modem 0138, a global positioning system (GPS) 1040, and an 802.11 Wi-Fi 1042.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
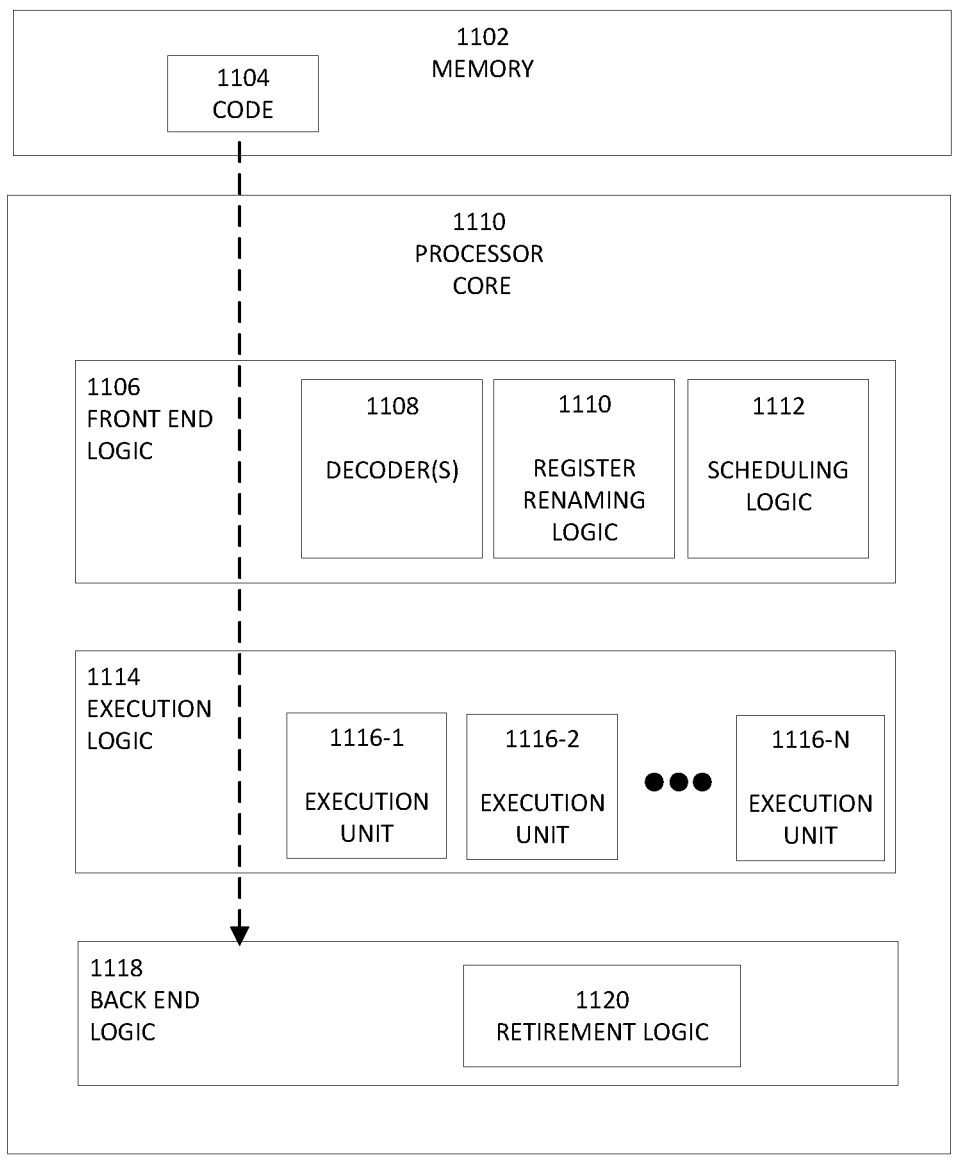
FIG. 11 is a block diagram illustrating an example processor core in accordance with an embodiment.

Turning to FIG. 11, FIG. 11 illustrates a processor core 1100 according to an embodiment. Processor core 1100 may be the core for any type of processor, such as a microprocessor, an embedded processor, a digital signal processor (DSP), a network processor, or other device to execute code. Although only one processor core 1100 is illustrated in FIG. 11, a processor may alternatively include more than one of the processor core 1100 illustrated in FIG. 11. For example, processor core 1100 represents one example embodiment of processors cores 904a-904d shown and described with reference to processors 902a and 902b of FIG. 9. Processor core 1100 may be a single-threaded core or, for at least one embodiment, processor core 1100 may be multithreaded in that it may include more than one hardware thread context (or "logical processor") per core.

FIG. 11 also illustrates a memory 1102 coupled to processor core 1100 in accordance with an embodiment. Memory 1102 may be any of a wide variety of memories (including various layers of memory hierarchy) as are known or otherwise available to those of skill in the art. Memory 1102 may include code 1104, which may be one or more instructions, to be executed by processor core 1100. Processor core 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor core 1100 can also include execution logic 1114 having a set of execution units 1116-1 through 1116-N. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor core 1100 allows out of order execution but requires in order retirement of instructions. Retirement logic 1120 may take a variety of known forms (e.g., re-order buffers or the like). In this manner, processor core 1100 is transformed during execution of code 1104, at least in terms of the output generated by the decoder, hardware registers and tables utilized by register renaming logic 1110, and any registers (not shown) modified by execution logic 1114.

Although not illustrated in FIG. 11, a processor may include other elements on a chip with processor core 1100, at least some of which were shown and described herein with reference to FIG. 9. For example, as shown in FIG. 9, a processor may include memory control logic along with processor core 1100. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations in the preceding flow diagrams (i.e., FIGS. 3-5) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 has been illustrated with reference to particular elements and operations that facilitate the communication process, these elements and operations may be replaced by any suitable architecture, protocols, and/or processes that achieve the intended functionality of system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example M1 is a method including identifying a binary file, identifying strings in the binary file, determining that at least one string in the binary file is larger than one kilobyte of data, identifying at least one substring from each of the at least one strings in the binary file is larger than one kilobyte of data, and analyzing each of the at least one substrings to determine if each of the at least one substrings are suspicious and related to malware.

In Example M2, the subject matter of Example M1 can optionally include where the at least one string in the binary file is larger than two kilobytes of data.

In Example M3, the subject matter of any one of the Examples M1-M2 can optionally include where strings in a suspicious string database are compared to each of the at least one substrings and if there is a match, a matching substring is considered suspicious and related to malware.

In Example M4, the subject matter of any one of the Examples M1-M3 can optionally include identifying static features of the binary file, wherein the static features help to determine if a substring is suspicious and related to malware.

In Example M5, the subject matter of any one of the Examples M1-M4 can optionally include communicating a substring to a server for further analysis.

In Example M6, the subject matter of any one of the Examples M1-M5 can optionally include where the server performs additional analysis to determine if the substring is related to malware.

In Example M7, the subject matter of any one of the Examples M1-M6 can optionally include adding the substring to a suspicious string database if the substring is related to malware.

Example C1 is at least one machine readable storage medium having one or more instructions that when executed by at least one processor, cause the at least one processor to identify a binary file, identify strings in the binary file, determine that at least one string in the binary file is larger than two kilobytes of data, identify at least one substring from each of the at least one strings in the binary file is larger than two kilobytes of data, and analyze each of the at least one substrings to determine if each of the at least one substrings are suspicious and related to malware.

In Example C2, the subject matter of Example C1 can optionally include where the at least one string is larger than one kilobyte of data.

In Example C3, the subject matter of any one of Examples C1-C2 can optionally include where each of the at least one substrings is compared to strings in a suspicious string database and if there is a match, a substring is considered suspicious and related to malware.

In Example C4, the subject matter of any one of Examples C1-C3 can optionally include where the one or more instructions that when executed by the at least one processor, further cause the processor to identify static features of the binary file, wherein the static features help to determine if a substring is suspicious and related to malware.

In Example C5, the subject matter of any one of Examples C1-C4 can optionally include where the one or more instructions that when executed by the at least one processor, further cause the processor to communicate a substring to a server for further analysis.

In Example C6, the subject matter of any one of Example C1-05 can optionally include where the server performs additional analysis to determine if the substring is related to malware.

In Example C7, the subject matter of any one of Examples C1-C6 can optionally include where the substring is added to a suspicious string database if the substring is related to malware.

In Example A1, an apparatus can include a security engine. The security engine can be configured to identify a binary file, identify strings in the binary file, determine that at least one string in the binary file is larger than one kilobyte of data, identify and extract at least one substring from each of the at least one strings in the binary file is larger than one kilobyte of data, and analyze each of the at least one substrings to determine if each of the at least one substrings are suspicious and related to malware.

In Example, A2, the subject matter of Example A1 can optionally include where the at least one string is larger than two kilobytes of data.

In Example A3, the subject matter of any one of Examples A1-A2 can optionally include where each of the at least one substrings is compared to strings in a suspicious string database and if there is a match, a substring is considered suspicious and related to malware.

In Example A4, the subject matter of any one of Examples A1-A3 can optionally include where the security engine is further configured to extract static features of the binary file, wherein the static features help to determine if a substring is suspicious and related to malware.

In Example A5, the subject matter of any one of Examples A1-A4 can optionally include where a substring is communicated to a server for further analysis.

In Example A6, the subject matter of any one of Examples A1-A5 can optionally include where the substring is added to a suspicious string database if the substring is related to malware.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A method comprising:
identifying a binary file;
identifying strings in the binary file;
determining that at least one string in the binary file is larger than one kilobyte of data;
identifying at least one substring from each of the at least one strings in the binary file that is larger than one kilobyte of data; and
analyzing each of the at least one substrings to determine if each of the at least one substrings is suspicious and related to malware.

2. The method of claim 1, wherein the at least one string in the binary file is larger than two kilobytes of data.

3. The method of claim 1, wherein strings in a suspicious string database are compared to each of the at least one substrings in the binary file and if there is a match, a matching substring is considered suspicious and related to malware.

4. The method of claim 1, further comprising:
identifying static features of the binary file, wherein the static features help to determine if a substring is suspicious and related to malware.

5. The method of claim 1, further comprising:
communicating a substring to a server for further analysis.

6. The method of claim 5, wherein the server performs additional analysis to determine if the substring is related to malware.

7. The method of claim 6, further comprising:
adding the substring to a suspicious string database if the substring is related to malware.

8. At least one non-transitory computer-readable medium comprising one or more instructions that when executed by at least one processor, cause the at least one processor to:
identify a binary file;
identify strings in the binary file;
determine that at least one string in the binary file is larger than two kilobytes of data;
identify at least one substring from each of the at least one strings in the binary file is larger than two kilobytes of data; and
analyze each of the at least one substrings to determine if each of the at least one substrings are suspicious and related to malware.

9. The at least one computer-readable medium of claim 8, wherein each of the at least one substrings is compared to strings in a suspicious string database and if there is a match, a substring is considered suspicious and related to malware.

10. The at least one computer-readable medium of claim 8, further comprising one or more instructions that when executed by the at least one processor, further cause the processor to:
identify static features of the binary file, wherein the static features help to determine if a substring is suspicious and related to malware.

11. The at least one computer-readable medium of claim 8, further comprising one or more instructions that when executed by the at least one processor, further cause the processor to:
communicate a substring to a server for further analysis.

12. The at least one computer-readable medium of claim 11, wherein the server performs additional analysis to determine if the substring is related to malware.

13. The at least one computer-readable medium of claim 12, wherein the substring is added to a suspicious string database if the substring is related to malware.

14. An apparatus comprising:
memory; one or more processors; and a security engine configured to cause the one or more processor to:
identify a binary file;
identify strings in the binary file;
determine that at least one string in the binary file is larger than one kilobyte of data;
identify and extract at least one substring from each of the at least one strings in the binary file is larger than one kilobyte of data; and
analyze each of the at least one substrings to determine if each of the at least one substrings are suspicious and related to malware.

15. The apparatus of claim 14, wherein the at least one string is larger than two kilobytes of data.

16. The apparatus of claim 14, wherein each of the at least one substrings is compared to strings in a suspicious string database and if there is a match, a substring is considered suspicious and related to malware.

17. The apparatus of claim 14, wherein the security engine is further configured to:
extract static features of the binary file, wherein the static features help to determine if a substring is suspicious and related to malware.

18. The apparatus of claim 14, wherein a substring is communicated to a server for further analysis.

19. The apparatus of claim 18, wherein the substring is added to a suspicious string database if the substring is related to malware.

* * * * *

UNITED STATES PATENT AND TRADEMARK OFFICE
CERTIFICATE OF CORRECTION

PATENT NO. : 10,824,723 B2
APPLICATION NO. : 16/142014
DATED : November 3, 2020
INVENTOR(S) : Burke Page 1 of 1

It is certified that error appears in the above-identified patent and that said Letters Patent is hereby corrected as shown below:

In the Claims

In Column 18, Line 39, in Claim 9 delete "The at least one computer-readable medium" and insert -- "At least one non-transitory computer-readable medium" --, therefor.

In Column 18, Line 56, in Claim 10 delete "The at least one computer-readable medium" and insert -- "At least one non-transitory computer-readable medium" --, therefor.

In Column 18, Line 63, in Claim 11 delete "The at least one computer-readable medium" and insert -- "At least one non-transitory computer-readable medium" --, therefor.

In Column 19, Line 1, in Claim 12 delete "The at least one computer-readable medium" and insert -- "At least one non-transitory computer-readable medium" --, therefor.

In Column 19, Line 4, in Claim 13 delete "The at least one computer-readable medium" and insert -- "At least one non-transitory computer-readable medium" --, therefor.

Signed and Sealed this
Fifth Day of January, 2021

Andrei Iancu
*Director of the United States Patent and Trademark Office*